United States Patent [19]
Ward

[11] Patent Number: 5,292,226
[45] Date of Patent: Mar. 8, 1994

[54] VACUUM SEAL

[75] Inventor: Dudley E. J. Ward, Auckland, New Zealand

[73] Assignee: Milcon Developments (NZ) Limited, Auckland, New Zealand

[21] Appl. No.: 822,646

[22] Filed: Jan. 21, 1992

[30] Foreign Application Priority Data

Jan. 25, 1991 [NZ] New Zealand .................... 236907

[51] Int. Cl.⁵ .............................................. F01D 11/00
[52] U.S. Cl. .............................. 415/170.1; 415/171.1; 277/57; 34/15
[58] Field of Search ...................... 415/170.1, 229, 230; 34/15, 92; 277/53, 57, 55, 96.1; 159/DIG. 16, 24.3, 40; 202/205; 203/DIG. 14, 24, 26, 91

[56] References Cited

U.S. PATENT DOCUMENTS

| | | | |
|---|---|---|---|
| 971,183 | 9/1910 | Faget | 202/205 |
| 2,536,292 | 1/1951 | Kollsman | 415/230 |
| 2,570,212 | 10/1951 | Cross | 34/15 |
| 2,573,425 | 10/1951 | Fletcher | |
| 2,709,629 | 5/1955 | Ledinegg | 277/55 |
| 3,127,181 | 3/1964 | Crego | |
| 3,131,641 | 5/1964 | Cygnor | 277/57 |
| 3,411,992 | 11/1968 | Mitchell | 203/26 |
| 4,645,414 | 2/1987 | De Hart et al. | 415/170.1 |
| 4,830,182 | 5/1989 | Nakazato | 277/53 |
| 4,902,197 | 2/1990 | Rhodes et al. | 415/171.1 |
| 4,972,986 | 11/1990 | Lipschitz | 277/96.1 |

FOREIGN PATENT DOCUMENTS

| | | |
|---|---|---|
| 63714/90 | 5/1991 | Australia . |
| M-845 | 3/1989 | Japan . |
| 1138095 | 12/1968 | United Kingdom . |

Primary Examiner—Edward K. Look
Assistant Examiner—Mark Sgantzos
Attorney, Agent, or Firm—Merchant & Gould, Smith, Edell, Welter & Schmidt

[57] ABSTRACT

In FIG. 5, a rotor ($22^1$) has a sealing face ($24^1$) provided with a plurality of grooves ($33^1$) in which a sealing fluid can be held by counter-balanced centrifugal and pressure differential forces as the rotor ($22^1$) rotates to form a seal across the sealing face ($24^1$). In alternative embodiments the grooves (33) can be of constant width and/or not radially disposed. In a specific use, the sealing arrangement seals a vacuum in a milk concentrator.

12 Claims, 11 Drawing Sheets

VACUUM SEAL

BACKGROUND OF THE INVENTION

The present invention relates to seal arrangements and particularly but not exclusively, to seal arrangements for use in liquid concentrators.

A liquid concentrator is an apparatus in which an evaporation process can result in a more concentrated liquid. In an agricultural based economy such as New Zealand, such apparatus has particular application in the concentration of milk.

The benefits to be derived from milk volume reduction are numerous and of tremendous commercial importance. It will be appreciated that by removing a substantial amount of the water contained in the milk in its natural state, the cost of collection, transporting and processing the milk can be substantially reduced.

In apparatus such as concentrators, various rotary and/or static seals are required to ensure that the prescribed pressures and/or vacuums are maintained and that there is no cross contamination of the fluid flows across the various parts of the apparatus.

In developing its concentrator technology, the applicant has developed the present invention for use in apparatus such as concentrators. To the present time, various sealing arrangements have been proposed to particular type of apparatus. In U.S. Pat. No. 4,902,197 (Rhodes et al), a seal arrangement for a centrifugal type of pump prevents fluid such as steam, pressurised by the pump, from escaping from the pump housing. The sealing arrangement consists of a continuous liquid seal extending circumferentially around an axial section of the shaft assembly of the pump, the liquid being held in place by the centrifugal action of the pump rotor and by the positive pressure gradient existing between the interior of the pump housing and its exterior.

While the present invention will be described hereinafter in its various embodiments with particular reference to a liquid concentrator, it will be appreciated by those skilled in the engineering arts that the sealing arrangements of the present invention may find application wherever an appropriate seal is required to be provided.

OBJECTS OF THE INVENTION

It is thus an object of the present invention in its various embodiments to provide an improved sealing arrangement for an apparatus such as a liquid concentrator which will provide for an effective seal having advantages over sealing arrangements available to the present time or which at least will provide the public with a useful choice.

Further objects of the invention in its various embodiments will become apparent from the following description.

SUMMARY OF THE INVENTION

According to one aspect of the present invention, there is provided a method of providing a seal across an area in which a pressure differential exists and within which area a rotatable means is caused to rotate and to which area a sealing fluid can be supplied and wherein said rotatable means provides a sealing face accessible by said sealing fluid for it to be held in position on said sealing face by centrifugal forces creating a seal, said method including the provision of one or more fluid flow paths for said sealing face of said rotatable means, in which flow paths said fluid will be held by counter-balanced centrifugal and pressure differential forces to form a seal across said sealing face.

According to a further aspect of the present invention, there is provided a sealing arrangement in which the method as immediately above defined is performed.

According to a still further aspect of the present invention, there is provided a sealing arrangement for an area in which a pressure differential exists, a rotatable means rotatable within said area and providing a sealing face accessible by a sealing fluid supplied to said sealing face including said sealing face having one or more of fluid flow paths in which said fluid will be held by counter-balanced centrifugal and pressure differential forces to form a seal across said sealing face.

According to a still further aspect of the present invention there is provided a sealing arrangement as defined in the paragraph immediately above including said flow paths each being a groove substantially radially disposed relative to said sealing face.

Further aspects of this invention which should be considered in all its novel aspects will become apparent from the following description given by way of example of possible embodiments.

BRIEF DESCRIPTION OF PREFERRED EMBODIMENTS

Figure 1:
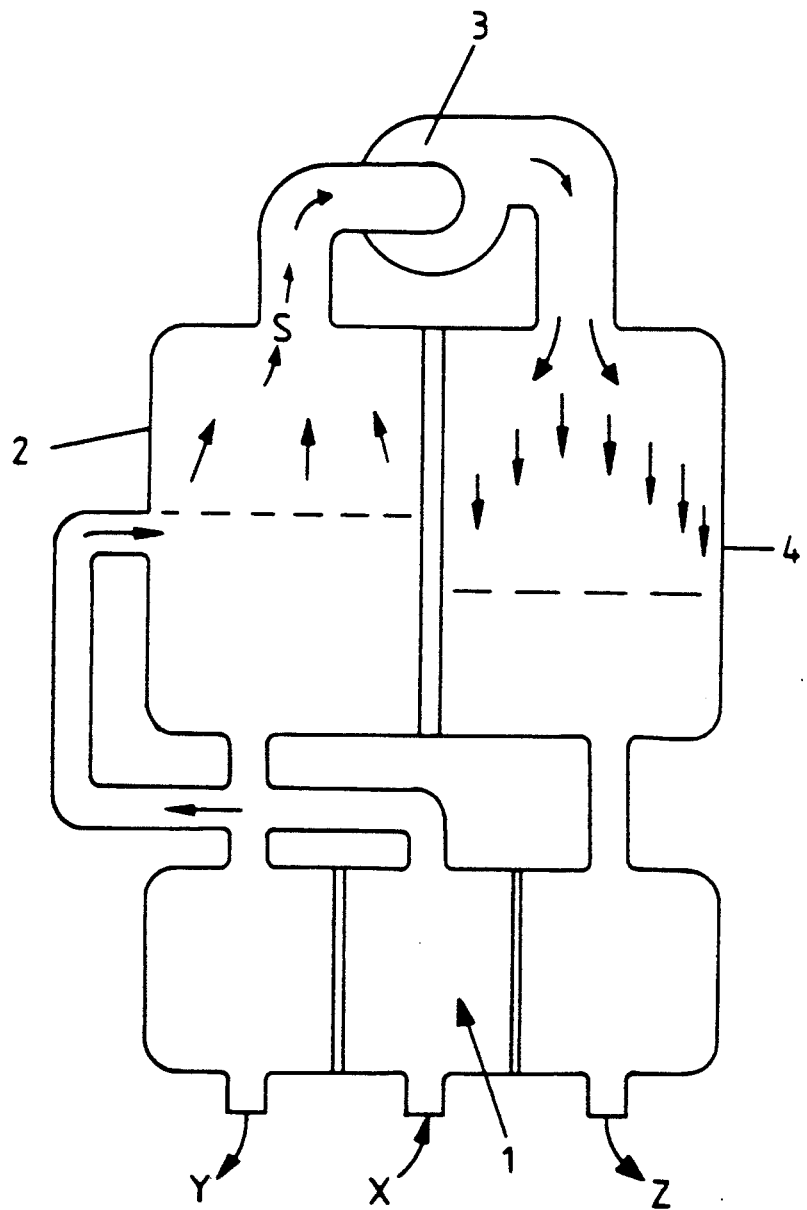
FIG. 1: shows schematically a milk concentrator apparatus in which the sealing arrangement of the present invention in its various embodiments may be utilised.

FIG. 1 of the accompanying drawings shows very diagrammatically a milk concentrator in which the sealing arrangements of the present invention can be used. In FIG. 1, milk will be supplied in a direction indicated by arrow X to a heat exchanger 1. In the heat exchanger 1, the milk will be warmed by the concentrated milk exiting in the direction indicated by arrow Y and by a clean water discharge indicated by arrow Z.

The warmed milk then travels into an evaporator 2 of any suitable type. Typically, the evaporator 2 can be a plate, shell and tube, tube and tube or any other type of evaporator allowing for the heat transfer resulting in the boiling of the milk. The milk is concentrated by boiling of the milk which concentrates it and the steam released, indicated by arrows S, is drawn into compressor 3 and then into a condenser 4 where the pressurised steam releases heat and condenses into pure water which is discharged in the direction of arrow Z. The heat released during condensation boils the milk. It will be appreciated by those skilled in the engineering arts, that the milk concentrator of FIG. 1, while seeking in this case as an end product the concentrated milk, could, utilising substantially the same principles of operation, be used for other purposes such as distilling alcohol or extracting pure water from polluted water, or reducing the volume of liquids such as fruit juices, toxic and other wastes, using the mechanical vapour recompression evaporation process.

It will also be appreciated by those skilled in the engineering arts that in an apparatus such as shown in FIG. 1, there will be various rotary and static seals required so as to maintain the necessary pressure differentials and, in the applicant's apparatus, the vacuum under which the system is operating. Also it is important to seal the flow paths for the steam, milk and water to prevent or at least reduce cross contamination between them.

Figure 2:
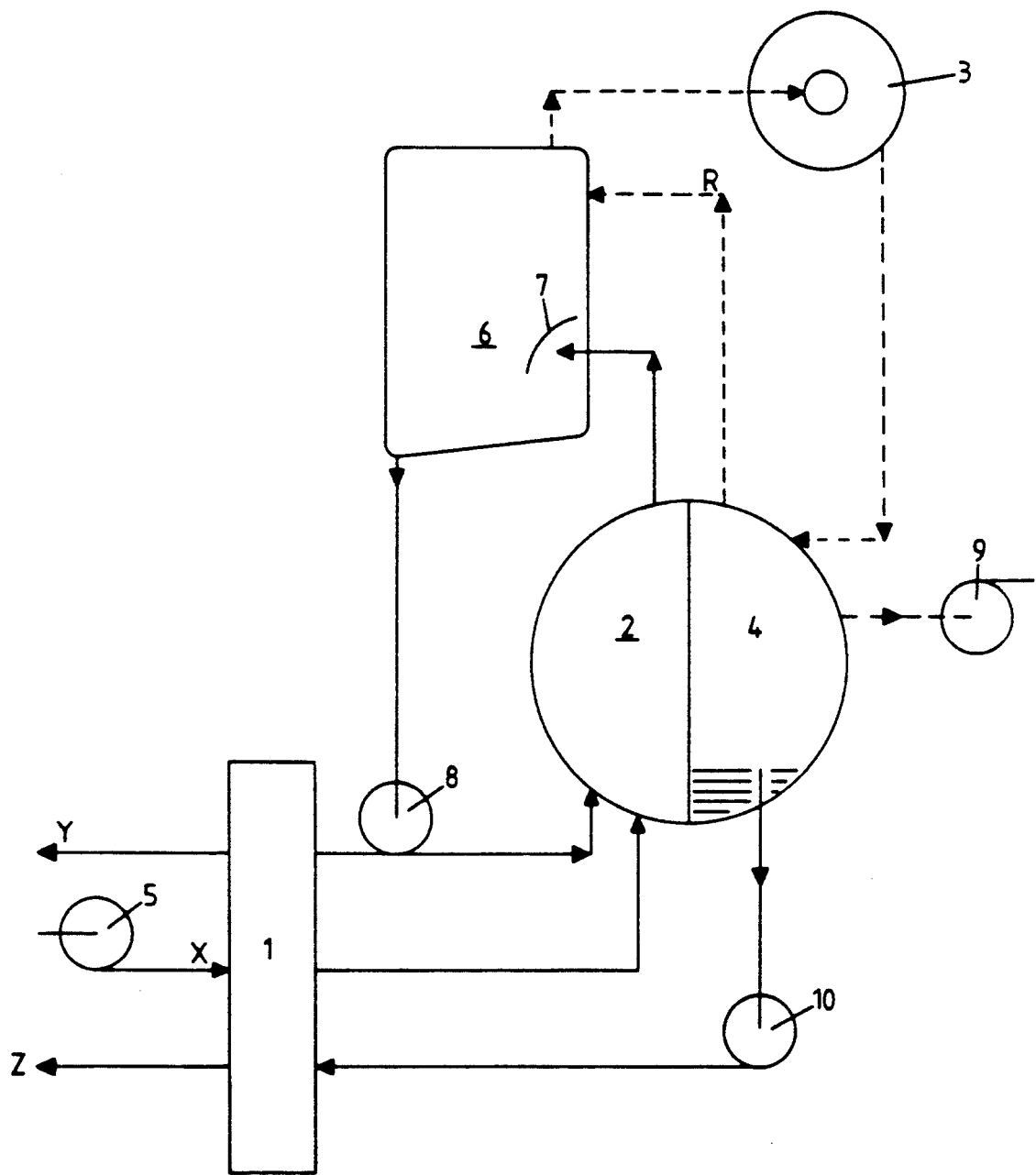
FIG. 2: shows schematically in flow diagram form part of the concentrator apparatus of FIG. 1.

As further background to the present invention, FIG. 2 illustrates in greater detail the apparatus of FIG. 1. Thus in FIG. 2, the heat exchanger 1 is shown being supplied with the milk in the direction of arrow X, by product supply pump 5, and the concentrated milk and condensate exiting from the heat exchanger 1 in the directions indicated by arrows Y and Z respectively. The milk warmed in exchanger 1 is then shown passing through the evaporator 2 where it is boiled and the boiling milk being transferred to an inertial separator 6. The separator 6 is illustrated diagrammatically as having an arcuate inlet 7 to facilitate the separation process.

The concentrated milk from the separator 6 is then shown being transferred via concentrate pump 8 back to the heat exchanger 1 although part of the milk concentrate is recirculated as indicated by the arrows back through the evaporator 2.

The steam from the separator 6 is shown in dotted lines being drawn into the compressor 3 and the pressurised steam then being caused to travel to condenser 4 connected as shown to a vacuum pump 9 which maintains the required vacuum within the apparatus. The condensate from the condenser 4 is then shown being pumped by condensate pump 10 to the heat exchanger 1. Some of the steam is shown being recycled from the condenser 4 to the separator 6 in a direction indicated by arrows R, it having been found that the efficiency of the system can be improved by such vapour recycling.

The compressor 3 may typically be receiving steam at about 1 psi absolute and compressing it to approximately 3 psi absolute so that there can be a pressure differential of about 2 psi across the compressor 3. With atmospheric pressure being 14.7 psi absolute, the whole system is operating under vacuum and there will therefore be a need to preserve this vacuum by appropriate static and dynamic seals and in the case of the compressor 3, particularly a seal between that part of the compressor within the system under vacuum and that part which is external of the system and subject to atmospheric pressure.

The milk concentrator of FIGS. 1 and 2 is provided as a background to the development of the sealing arrangement of the present invention and which will now be described more fully in respect of the other drawings.

Figure 3:
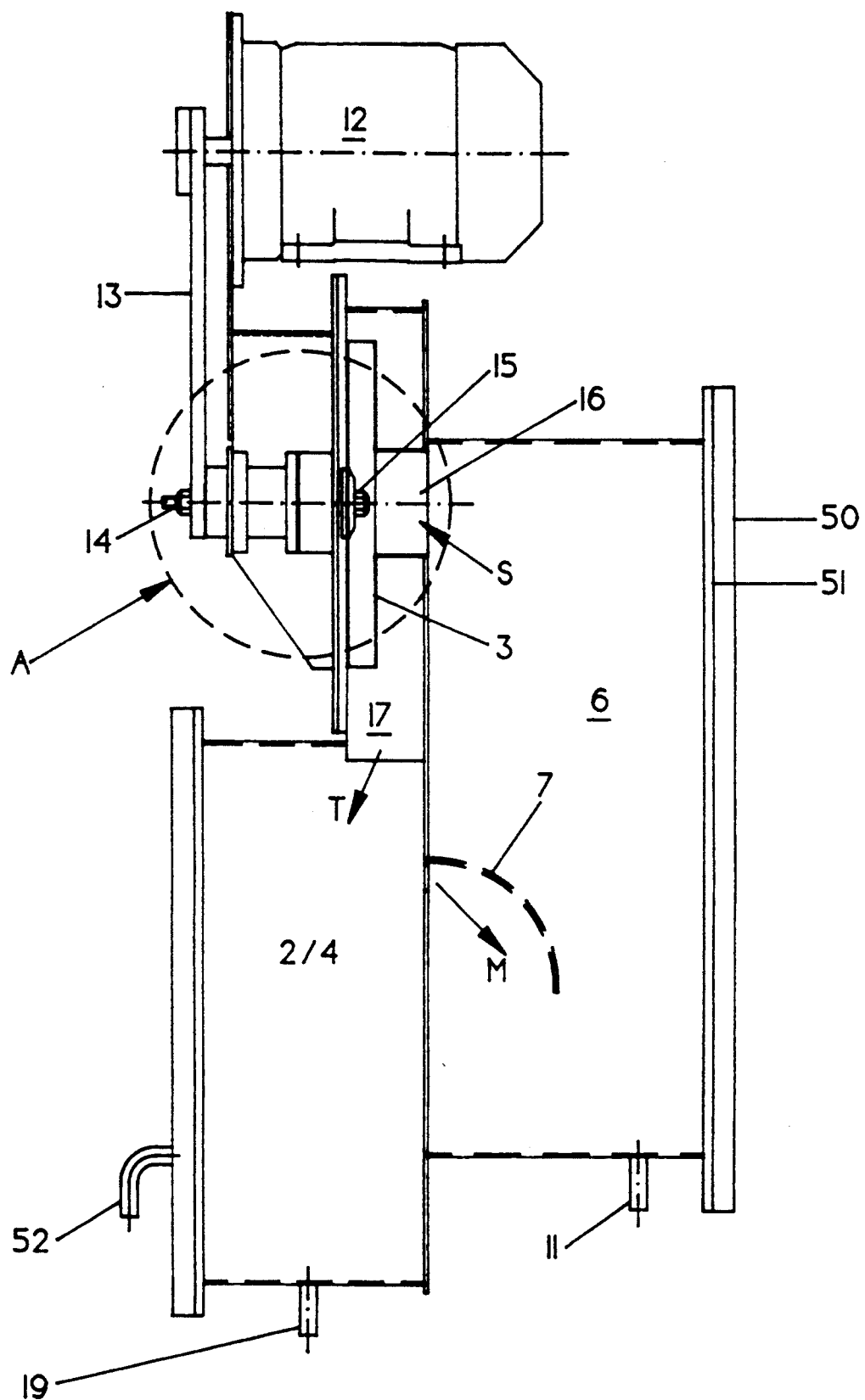
FIG. 3: shows a side view of part of the apparatus of FIGS. 1 and 2.

Referring firstly to FIG. 3, the milk concentrator apparatus of FIGS. 1 and 2 is shown in greater detail. Warm milk is supplied to the evaporator/condenser unit 2/4 through inlet pipe 52. The boiling milk is transferred from the evaporator/condenser unit 2/4 to the separator 6, in the direction shown by arrow M, using a curved inlet member 7. The concentrate then leaves the separator 6 through an outlet pipe 11 and the steam is drawn off by compressor 3 in the direction indicated by arrow S. The compressor 3 is shown being driven by a motor 12 by means of a belt drive 13. The shaft 14 of the compressor 3 is shown with an end nut 15 extending into the vacuum space of the separator 6 while the opposite end of the shaft 14, at the end driven by the fan belt 13, is extending out into free space at atmospheric pressure. The steam under vacuum will be drawn through the compressor inlet 16 to be pressurised by the compressor 3 and then discharged into the condenser part 4 of the evaporator/condenser assembly 2/4 through outlet 17 and as indicated by arrow T. The pressurised steam, after releasing its latent heat in the condenser 4 to boil the milk will exit as condensate through an outlet pipe 19. The heat exchanger plates, or other heat exchange equipment, (not shown) will be contained in the assembly 2/4.

Figure 4:
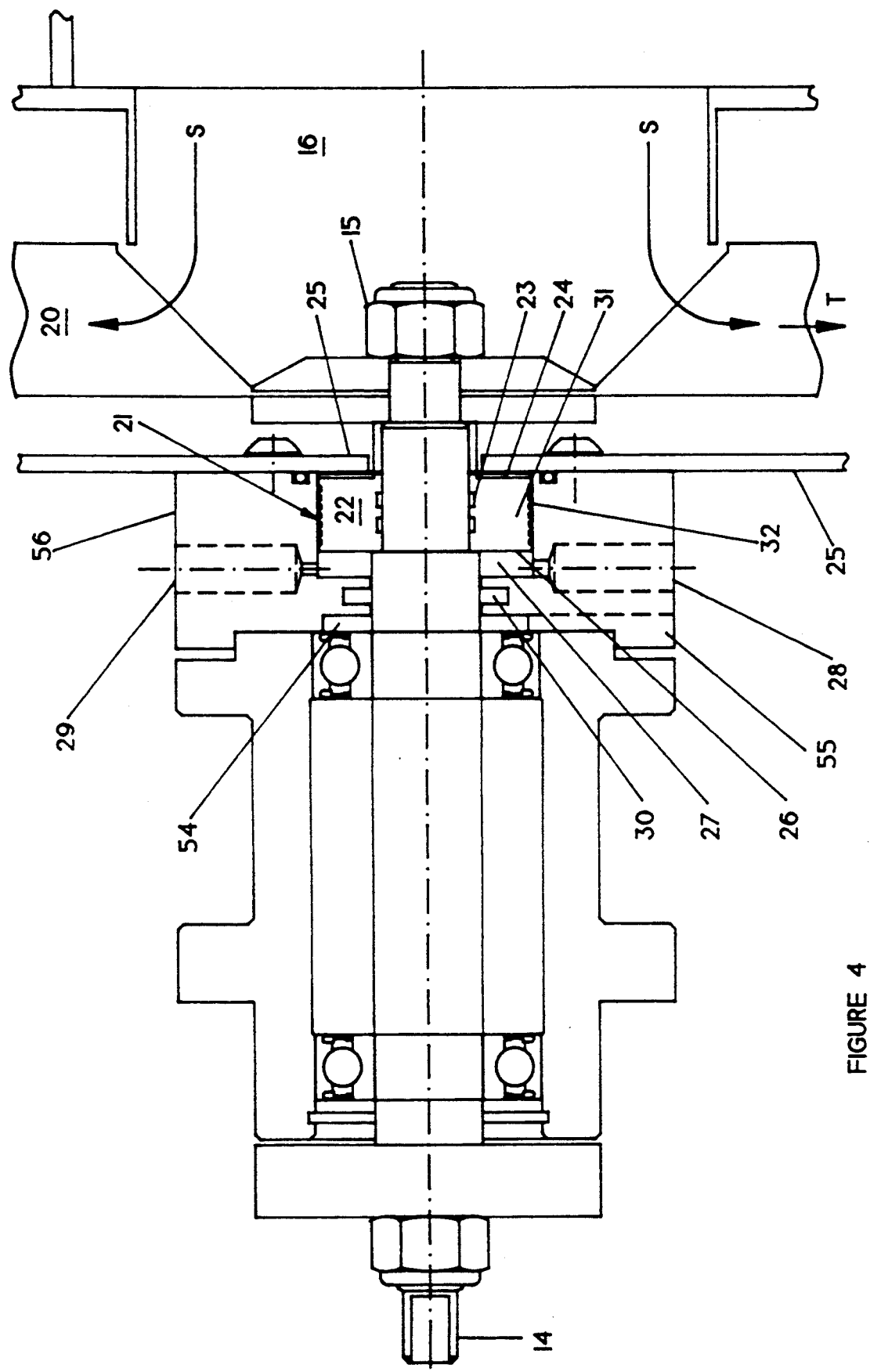
FIG. 4: shows an enlarged cross-sectional view of the area designated A in FIG. 3.

Referring now to FIG. 4 in conjunction with FIG. 3, this figure shows an enlarged cross-sectional view of the compressor assembly "A" of FIG. 3. In particular, it illustrates the sealing arrangement according to one possible embodiment of the invention.

The compressor 3 is shown with its shaft 14 having a lock nut 15 at its end facing into the area under vacuum from which the steam is being drawn in a direction indicated by arrows S. The shaft 14 is shown provided with an impeller 20 which rotates to compress the steam for it to exit under increased pressure in the direction indicated by arrow T through the outlet 17 (see FIG. 3).

A sealing arrangement referenced generally by arrow 21 is shown provided in order to maintain the vacuum seal. The sealing arrangement 21 is shown comprising a rotor member 22 mounted in a sealed relationship on shaft 14 by means of a pair of "O" rings 23 and rotatable with the shaft 14. The rotatable member 22 has a front face 24 facing an extension of housing wall 25. This face 24, as is described hereinafter, includes a plurality of grooves in which a sealing fluid is maintained by centrifugal action in providing a seal between the front face 24 and the plate 25. Behind the rear face 26 of member 22, is shown a chamber 27 into which a sealing fluid, in this case water, can be supplied via inlet 28 and outlet 29 (although these roles may be reversed) and behind chamber 27 a further chamber 30. The inlet/outlet 28, 29 can be disposed relative to one another at any desired angle, not necessarily opposite one another as shown. In an alternative embodiment the water may be introduced to the circumferential face 31 and/or the face 24 itself. The circumferential face 31 of the member 22 is shown in this embodiment provided with a plurality of circumferential grooves 32 although as is described hereinafter, such grooves 32 are not present in all embodiments of the invention.

In operation, water caused to flow into the chamber 27 will be drawn by the vacuum present in inlet 16 across the circumferential face 31 and down the front face 24. With the rotation of the member 22, a balance point is achieved within the grooves provided in the face 24 at which the centrifugal force acting on the water in the radial grooves will be balanced by the vacuum. The water retained at that balance point in the grooves will then provide a fluid seal for the face 24 against the adjoining surface 25.

The fluid seal so created will be operating in the clearance between the face 24 and the surface 25 and the clearance between the circumferential face 31 and the body of the seal assembly 56.

The rear chamber 30 is able to accommodate any overflow of water from the chamber 27. A final overflow chamber 54 is shown into which water from chambers 27 and 30 can pass to be discharged through drain slot 55.

It will be appreciated that in existing rotary seals, typically there will be metal, ceramic or carbon faces working together. In such existing seals, a cooling liquid, or the working fluid, is necessary to maintain the integrity of the seal as otherwise the rapid heat build up can result in the sealing faces being damaged or destroyed within a relatively short time.

In contrast, in the sealing arrangement 21 of the present invention, the water, or other sealing fluid, may be turned on at any required time with the member 22 rotating or not, and while, without the sealing fluid, only a partial seal will be obtained, no damage will caused to the apparatus. The water can therefore be supplied to the chamber 27 before or after the shaft 14 has been run up to speed.

The member 22 may be of any suitable material such as a metal, plastics or any other suitable material or composite materials.

Figure 5:
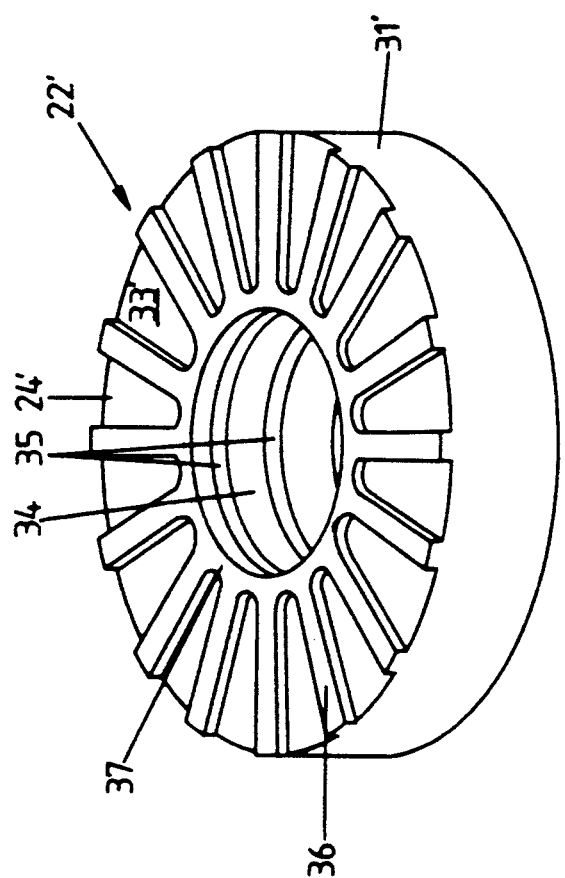
FIG. 5: shows a perspective front view of a sealing member according to one possible embodiment of the invention.
Figure 6:
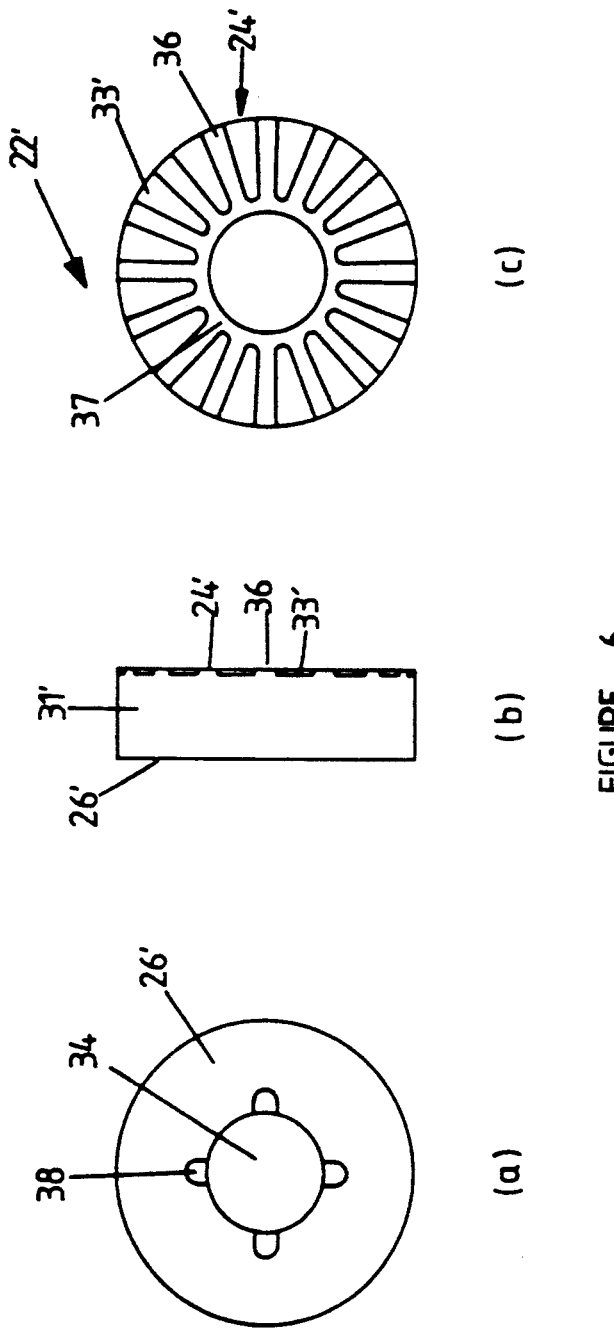
FIGS. 6(a), (b) and (c): show respectively rear, side and front views of the sealing member of FIG. 5.

Referring to FIGS. 5 and 6, a seal member or rotor $22^1$, according to one possible embodiment of the invention is shown with its front face $24^1$ provided with a plurality of grooves $33^1$. The grooves $33^1$ in this embodiment are shown radially disposed on the face $24^1$ and each in the form of a "U" or "V" shape having a width increasing towards the circumferential face $31^1$ of the rotor $22^1$. The grooves $33^1$ may be integrally formed with the member $22^1$ such as by moulding, casting or the like or may be formed subsequently such as by cutting, milling, etching or the like. In a further alternative embodiment, it is envisaged that the grooves $33^1$ could be provided by the laying over, on the face $24^1$, of a discrete member which when secured to the face $24^1$ forms the grooves, channels or the like $33^1$. The inner bore 34 of member $22^1$ is shown provided with a pair of inner grooves 35 to accommodate the "O" rings 23 (see FIG. 4). The circumferential face $31^1$ is shown as being smooth, i.e. it does not have the grooves or channels (32) as in the embodiment shown in FIG. 4. While it has been found that the sealing member 22 will operate with and without the grooves or channels 32, it is believed that their absence may, as well as making the design of the member 22 less complex, also assist in the ease of rotation of the member 22. The number, size and shape of the grooves $33^1$ and 32 (see FIG. 4) may be appropriate to the speed with which the member 22 is rotated and the vacuum to which the seal relates. It will be appreciated here that the size, shape and number of the grooves $33^1$ and 32 (see FIG. 4) will determine the volume of water which is being held at a particular position in the grooves $33^1$ and 32 and at a particular speed by the centrifugal force balanced against the vacuum forces. In the embodiment shown in FIGS. 5 and 6, the ribs 36 defined by the grooves $33^1$ meet at a central portion 37 surrounding the bore 34 so that the grooves $33^1$ do not extend immediately into the bore 34 and the vacuum space about the shaft 14.

The rear face $26^1$ of the embodiment shown in FIGS. 5 and 6 is shown provided with a plurality of "key ways" 38 about the rear end of the bore 34 for holding the member $22^1$ onto the shaft 14.

It is believed that some of the water may be positioned exterior of the grooves $33^1$ to provide a sealing between the surface of the ribs 36 and the sealing face 25 (see FIG. 4) i.e. in the clearance between the faces 24 and 25 to be combined with the sealing effect provided by the water held by the counterbalance of the aforementioned forces within the grooves $33^1$.

Figure 7:
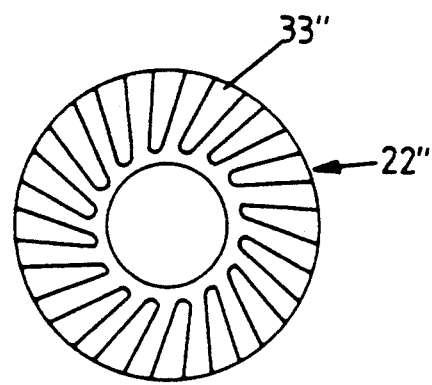
FIG. 7: shows a front view of a sealing member according to a further embodiment of the invention.

Referring to FIG. 7, in an alternative embodiment of the invention, the member $22^{11}$ has grooves $33^{11}$ which are fanned, twisted or off-set relative to the radial axes of the member $22^{11}$. The grooves $33^{11}$ are again shown of a "V" or "U" shape diverging towards the periphery of the member $22^{11}$. Depending on the direction of rotation of the member $22^{11}$ this fanning or off-setting of the grooves $33^{11}$ may provide for an improved sealing and/or improved power consumption.

Figure 8:
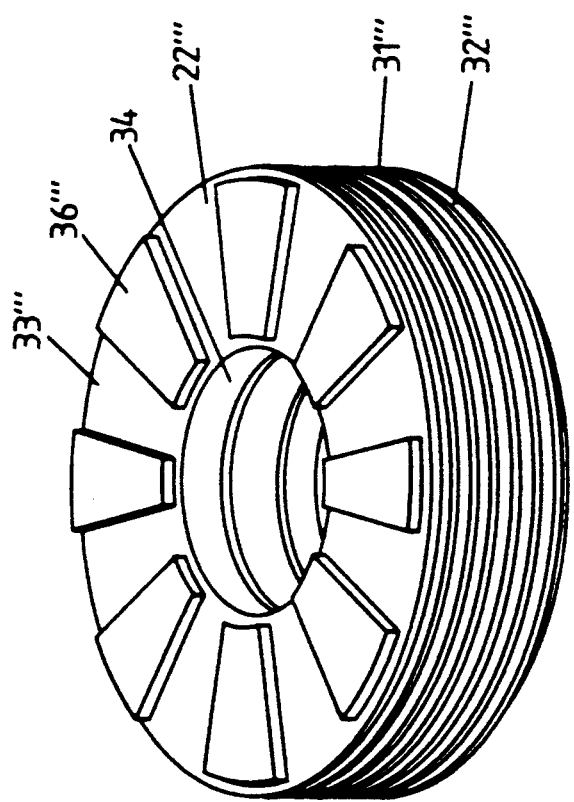
FIG. 8: shows a front perspective view of a sealing member according to a still further embodiment of the invention.
Figure 9:
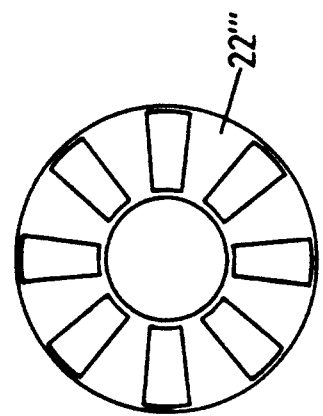
FIGS. 9(a), (b) and (c): show respectively rear, side and front views of the sealing member of FIG. 8.
Figure 9:
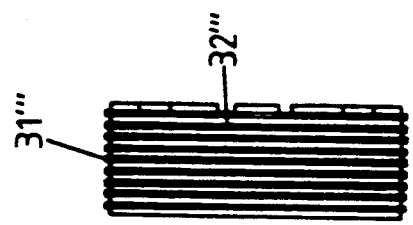
Figure 9:
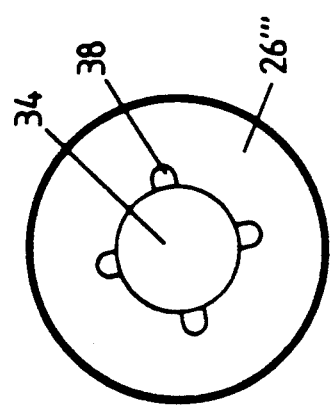

Referring now to FIGS. 8 and 9, in an alternative embodiment of the invention, the member $22^{111}$ is shown provided with a plurality of radial grooves $33^{111}$ which extend directly to the bore 34, the intervening ribs $36^{111}$ being foreshortened so as not to reach the lip of the bore 34. The circumferential face $31^{111}$ is also in this embodiment shown with the circumferential grooves or channels $32^{111}$ as first illustrated in the embodiment shown in FIG. 4. The grooves $33^{111}$ again have a width which increases towards the circumferential face $31^{111}$.

In each of the embodiments shown in FIGS. 5 to 8 the grooves 33 have been radially disposed, or in the case of the embodiment of FIG. 7 off-set relative to the radial axes, and with a width which increases towards the periphery 31 of the rotor 22.

It is envisaged however that in alternative embodiments the grooves 33 could be of constant width, i.e. with parallel sides and/or that the grooves 33 could have variable respective widths. In one embodiment therefore the face 24 of the rotor 22 could have several sets of grooves 33, the width of each could vary and/or have different widths within the grooves of each set.

Figure 10A:
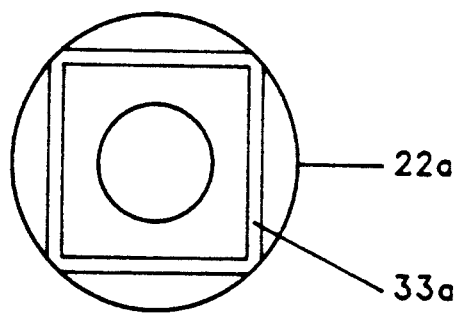
FIGS. 10 a, b and c: show front views of sealing members according to still further embodiments of the invention.

It is also envisaged that the grooves 33 may not be radially disposed and could for example define one or more continuous grooves extending about the face 24 in a particular configuration. In this regard, referring to FIG. 10a, a further embodiment of the invention shows a sealing member 22a in which the grooves 33a define a substantially square-shaped continuous flowpath. In an embodiment such as shown in FIG. 10a the water will, by centrifugal action, and, counter-balanced by the vacuum, be retained within the grooves 33a towards the peripheral edge of the grooves 33a. As mentioned previously, while a substantially square configuration for the resultant flowpath is shown in FIG. 10a, alternative configurations, such as circular or spiral for example, may be utilised.

Figure 10B:
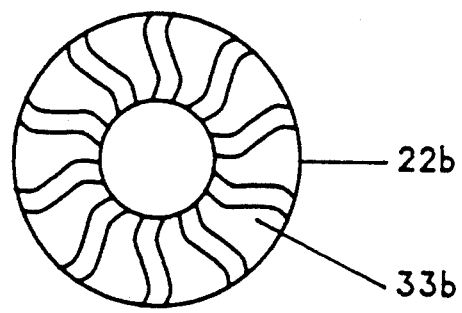

In FIG. 10b, the grooves 33b on rotor 22b are in this alternative embodiment of spiral and radial configurations.

Figure 10C:
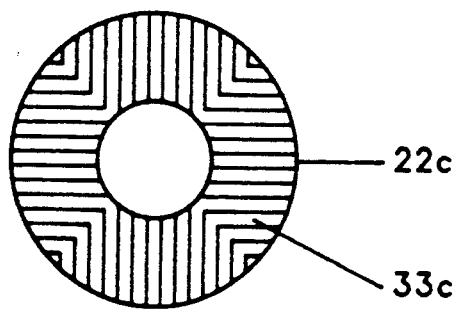

In FIG. 10c the grooves 33c of rotor 22c form a complex pattern which is given again by way of example only.

In all the above described embodiments of the rotor 22 in FIGS. 5 to 10, the grooves 33 have defined ribs 36 about the face 24. It is envisaged however that in alternative embodiments these grooves 33 and ribs 36 may be interchanged on the face 24 so that what is described as being a groove now becomes a rib and vice versa.

Figure 11:
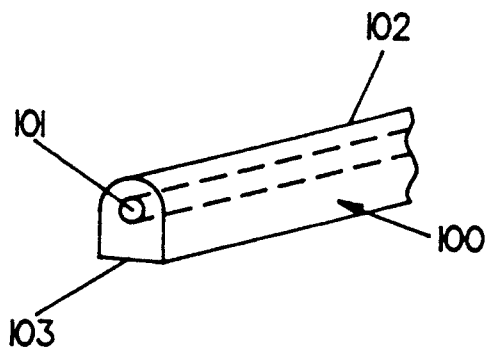
FIG. 11: shows a sealing member for use in conjunction with a further embodiment of the invention.

Referring now to FIG. 11 of the accompanying drawings, the apparatus of FIGS. 1 to 3 requires the provision of static as well as rotary seals. For example, referring to FIG. 3, a static seal will be required for the front cover 50 in its mating with flange 51 provided for the body of the separator 6.

Typically, "O" rings will be used for static seals, but these are not satisfactory in all circumstances in that some static seals may have adjacent surfaces abutting one another while in other circumstances, the adjacent surfaces may be spaced apart and/or irregular and/or not true to each other.

In FIG. 11 is therefore shown a static seal referenced generally by arrow 100. This is suitably made of a flexible, substantially incompressible, material such as an elastomer or rubber material, silicon rubber, nitrile rubber or EPDM, BUNA rubber for example. The sealing member 100 is shown with a substantially arcuate upper portion 102 and a substantially flat base portion 103. However, alternative shapes and dimensions of the member 100 may be utilised. For example, a member of a substantially circular or oval cross-section could be used.

A through aperture 101 is shown which may be incorporated into the sealilng member 100 extending at least through a substantial portion of the length of member 100 which itself is of an indeterminate length.

Figure 12:
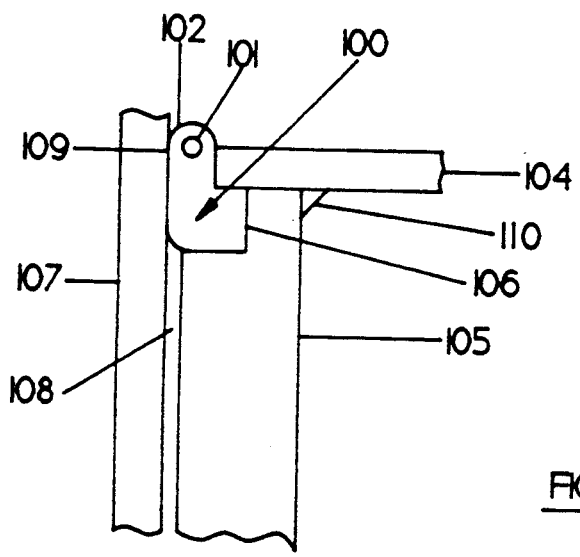
FIG. 12: shows very diagrammatically a cross-sectional view across a sealing arrangement utilising the sealing means of FIG. 11.

In use, and as shown in FIG. 12, plates 104, 105 and 107 may require a seal between them notwithstanding a space 108 between their opposed surfaces. In the context of the concentrator described previously, a vacuum may be present in the space above plate 104, with flange 105 exposed to atmospheric pressure. A flange or plate 105 is shown provided for the plate 104, suitably welded thereto as at 110. The sealing member 100 is shown provided within a groove or recess 106 in the flange 105 or plate 104. The height of the sealing member 100 is such that with the plates 104, 105 and 107 brought together, as shown, the upper surface 102 of the sealing member 100 has been deformed as at 109 so as to provide a seal between the upper edge of the flange 105 and the opposed surfaces of the plates 104 and 107 so as to provide a seal therebetween. The exposed end surface 102 of the sealing member 100 additionally provides a surface which may be readily cleaned of any debris or other foreign matter which may accumulate thereon. A hygenic seal between the surfaces can be created by the material of member 100 being suitably be of a silicon rubber or other approved materials so as to satisfy hygiene requirements for processing food product, such as milk, etc.

Figure 13:
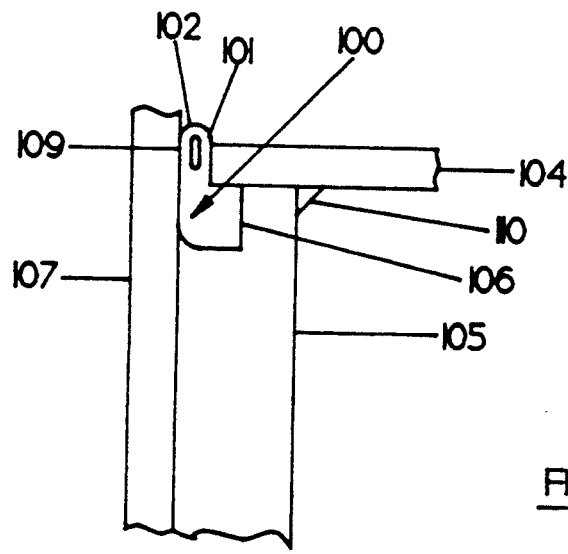
FIG. 13: shows very diagrammatically a cross-sectional view of a further sealing arrangement utilising the sealing means of FIG. 11.

In the example shown in FIG. 13, the flange 105 and the plate 107 are shown in actual or substantial abutment and with the end portion 102 of sealing member 100 again exposed beyond, and providing a seal between, the flange 105 and the plates 104 and 107.

It is seen therefore that the height of the member 100 between the upper and base portions 102 and 103 respectively, can be selected so as to accommodate differing dimensions of areas across which a static seal may be required.

The aperture 101 facilitates the transfiguration or change of the shape of the member 100 so as to form the seal between the abutting or non-abutting surfaces as the case may be. The groove or recess 106 used to locate the sealing member 100 may be formed in plates 104, 105 or 107 as appropriate.

Where in the foregoing description reference has been made to specific components or integers of the invention having known equivalents then such equivalents are herein incorporated as if individually set forth.

It is emphasised that while milk concentration has been specifically referred to, the present invention in all its various embodiments could be used throughout all areas of technology such as, desalination, water purification, including low temperature processes, dealcoholisation, distillation, recovery of liquid concentrates, and other processes and equipment, particularly where vacuum processing and evaporation is required.

Although this invention has been described by way of example and with reference to possible embodiments thereof it is to be understood that modifications or improvements may be made thereto without departing from the scope or spirit of the invention as defined in the appended claims.

I claim:

1. A vacuum sealing arrangement to seal an area in which a pressure differential exists comprising a rotor member rotatable within said area, said rotor member having a first sealing face orthogonal to the axis of rotation of said rotor member and defining a gap with a second sealing face, said first and second sealing faces defining said area in which said seal is to be created, said first sealing face having at least one fluid flow path into which a sealing fluid can be supplied to be held by counterbalanced centrifugal and pressure differential forces to create said seal within said gap between said first and second sealing faces, wherein said second sealing face is provided by a stationary plate member through which extends a shaft with which said rotor member rotates.

2. A vacuum sealing arrangement to seal an area in which a pressure differential exists comprising a rotor member rotatable within said area, said rotor member having a first sealing face orthogonal to the axis of rotation of said rotor member and defining a gap with a second sealing face, said first and second sealing faces defining said area in which said seal is to be created, said first sealing face having at least one fluid flow path into which a sealing fluid can be supplied to be held by counterbalanced centrifugal and pressure differential forces to create said seal within said gap between said first and second sealing faces, wherein said flow paths each comprises a groove provided in said first sealing face.

3. A vacuum sealing arrangement as claimed in claim 2 wherein each groove is substantially radially disposed relative to said first sealing face.

4. A vacuum sealing arrangement as claimed in claim 2 wherein each groove has a width which varies along its length.

5. A vacuum sealing arrangement as claimed in claim 4 wherein the width of each groove increases towards the circumference of the rotor member.

6. A vacuum sealing arrangement as claimed in claim 2 wherein each groove extends to a bore extending through said rotor member.

7. A vacuum sealing arrangement as claimed in claim 2 wherein each groove terminates at a distance from a bore extending through said rotor member.

8. A vacuum sealing arrangement as claimed in claim 2 wherein a plurality of circumferential grooves are provided on a circumferential face of said rotor member.

9. A liquid concentrator having a compressor connected between an evaporator and a condenser, both operating under vacuum, said compressor having a shaft with a rotor mounted thereon, said rotor having a first sealing face orthogonal to the axis of rotation of said rotor member and defining a gap with a second sealing face, said first and second sealing faces defining an area in which a pressure differential exists and in which a seal is to be created, said first sealing face having at least one fluid flow path into which a sealing fluid can be supplied to be held by counterbalanced centrifugal and pressure differential forces to create said seal within said gap between said first and second sealing faces.

10. A liquid concentrator as claimed in claim 9 wherein a chamber is provided behind a rear face of said rotor to provide a source of said sealing fluid which flows across a circumferential face of said rotor and into said fluid flow paths.

11. A liquid concentrator as claimed in claim 10 wherein said fluid flow paths, each comprises a groove provided in said first sealing face.

12. A liquid concentrator having a compressor connected between an evaporator and a condenser, both operating under vacuum, said compressor having a shaft with a rotor mounted thereon, said rotor having a first sealing face orthogonal to the axis of rotation of said rotor and defining a gap with the second sealing face, said first and second sealing faces defining an area in which a pressure differential exists and in which a seal is to be created, said first sealing face having at least one fluid flow path into which a sealing fluid can be supplied to be held by counterbalanced centrifugal and pressure differential forces to create said seal within said gap between said first and second sealing faces and wherein a separator is connected between said evaporator and said compressor, said separator supplying steam to said compressor which in turn supplies pressurized steam to said condenser, a proportion of said steam being recycled from said condenser to said separator.

* * * * *